United States Patent
Kim et al.

(10) Patent No.: US 11,563,906 B2
(45) Date of Patent: Jan. 24, 2023

(54) TDI IMAGE SENSOR CAPABLE OF ADJUSTING EXPOSURE TIME AND INSPECTION SYSTEM COMPRISING THE SAME

(71) Applicant: VIEWORKS CO., LTD., Anyang-si (KR)

(72) Inventors: Young Ho Kim, Seoul (KR); Young Young Sim, Anyang-si (KR)

(73) Assignee: VIEWORKS CO., LTD., Anyang-si (KR)

(*) Notice: Subject to any disclaimer, the term of this patent is extended or adjusted under 35 U.S.C. 154(b) by 15 days.

(21) Appl. No.: 17/337,115

(22) Filed: Jun. 2, 2021

(65) Prior Publication Data

US 2021/0385396 A1 Dec. 9, 2021

(30) Foreign Application Priority Data

Jun. 4, 2020 (KR) .................. 10-2020-0067932

(51) Int. Cl.
*H04N 5/372* (2011.01)
*H04N 5/355* (2011.01)
*H04N 5/369* (2011.01)
*H04N 5/341* (2011.01)

(52) U.S. Cl.
CPC ............. *H04N 5/355* (2013.01); *H04N 5/341* (2013.01); *H04N 5/3692* (2013.01)

(58) Field of Classification Search
CPC ... H04N 5/372; H04N 5/37206; H04N 5/3743
USPC ........................................................ 348/295
See application file for complete search history.

(56) References Cited

U.S. PATENT DOCUMENTS

| | | | |
|---|---|---|---|
| 10,554,899 B2 * | 2/2020 | Brubaker | H04N 5/35581 |
| 2005/0242380 A1 * | 11/2005 | Suzuki | A61B 6/548 |
| | | | 257/292 |
| 2008/0284883 A1 * | 11/2008 | Asahi | H04N 5/3532 |
| | | | 348/E3.019 |
| 2010/0265357 A1 * | 10/2010 | Liu | G06T 5/50 |
| | | | 348/E9.051 |
| 2016/0156863 A1 * | 6/2016 | Kim | H04N 5/3592 |
| | | | 348/308 |
| 2017/0150029 A1 * | 5/2017 | Robertson | H04N 5/35554 |
| 2021/0168320 A1 * | 6/2021 | Barbier | H01L 27/14812 |

FOREIGN PATENT DOCUMENTS

| | | |
|---|---|---|
| JP | H1175118 A | 3/1999 |
| JP | 2018006874 A | 1/2018 |
| KR | 1020070119147 A | 12/2007 |

* cited by examiner

*Primary Examiner* — Anthony J Daniels
(74) *Attorney, Agent, or Firm* — Rabin & Berdo, P.C.

(57) ABSTRACT

A TDI sensor which is capable of controlling the exposure according to the present disclosure includes a pixel unit which includes a plurality of line sensors; a light blocking unit which blocks light from being incident into some of the plurality of line sensors; a scan controller which generates an exposure control signal based on an external line trigger signal, generates an internal line trigger signal based on the external line trigger signal and the exposure control signal, and controls the movement of charges of the plurality of line sensors based on the internal line trigger signal.

11 Claims, 12 Drawing Sheets

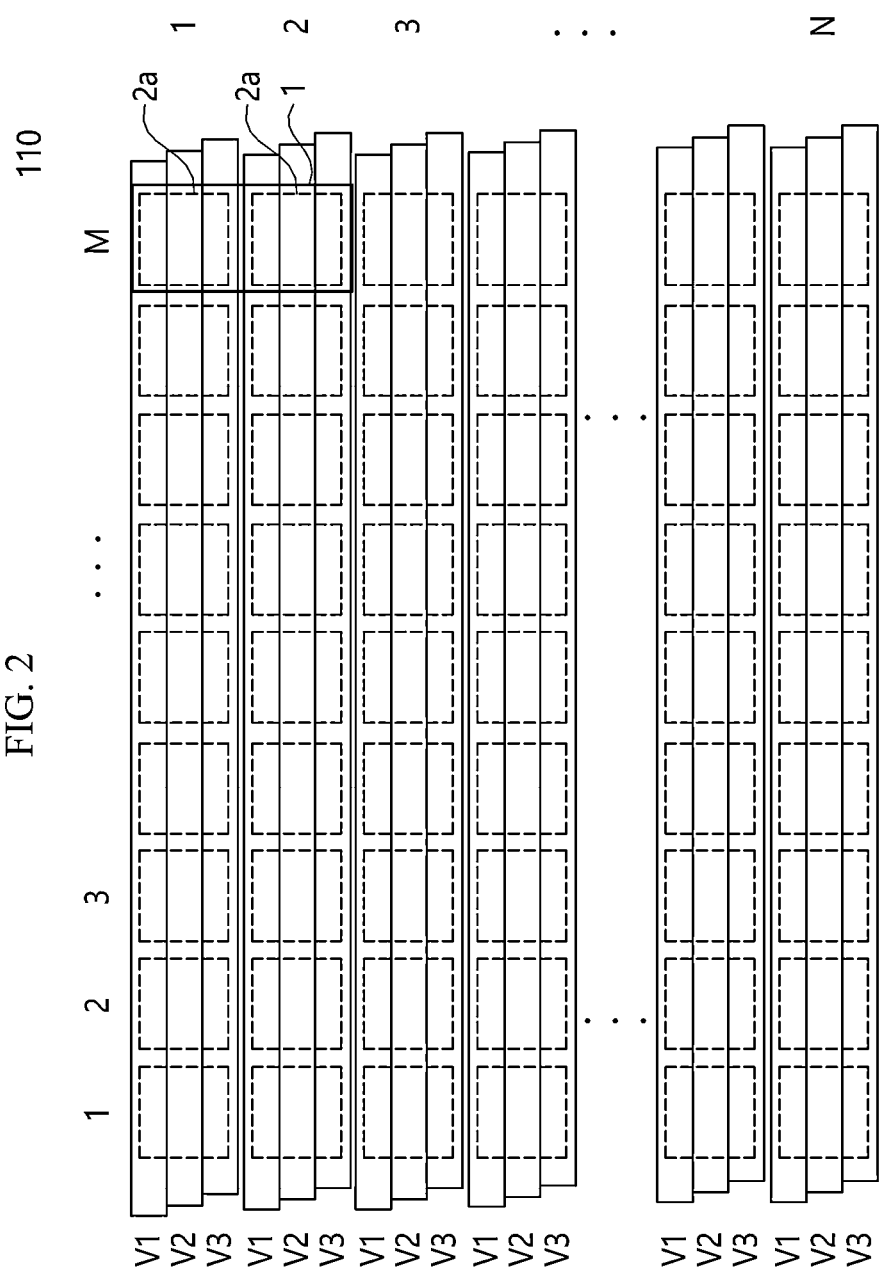

RELATED ART

TDI IMAGE SENSOR CAPABLE OF ADJUSTING EXPOSURE TIME AND INSPECTION SYSTEM COMPRISING THE SAME

CROSS-REFERENCE TO RELATED APPLICATIONS

This application claims priority to and the benefit of Korean Patent Application No. 10-2020-0067932 filed in the Korean Intellectual Property Office on Jun. 4, 2020, the entire contents of which are incorporated herein by reference.

BACKGROUND

1. Technical Field

The present disclosure relates to a time delayed integration (TDI) image sensor, and more particularly, to a TDI image sensor which is capable of adjusting an exposure time and an inspection system including the same.

2. Description of the Related Art

As production facilities become mass-produced, automated, and precise, functions which depend on human eyes or various sensors are being replaced by image sensors. As an example of a semiconductor device which is mainly used for the image sensor, there is a charge coupled device (CCD).

The charge coupled device (hereinafter, abbreviated as a CCD) refers to a device which transmits charges from one device to the other adjacent device. The image sensor using such a CCD has a structure which converts the change in a quantity of charges by an amount of light into an electrical signal. The image sensor which uses the CCD includes an output unit configured by a cell region in which charges are accumulated and a shift register which sequentially transmits the accumulated charges.

A scan method of the image sensor includes area scan, line scan, and time delayed integration (TDI) line scan methods.

In an image sensor using the TDI line scan method, a plurality of line sensors is disposed in a scan direction to transmit charges accumulated in the CCD of each line to a CCD of a next line by synchronizing with movement of a scanning object. By repeating this process for the sensor to the last line, the charges are accumulated and then output to obtain an image.

Referring to FIG. 12, the TDI line sensor accumulates charges in the CCD sensor by converting light from the target for every line into an electric energy and moves the accumulated charges to the scan direction. In an integration step of FIG. 12, charges accumulated in the TDI line sensor are repeatedly accumulated by being shifted-down in accordance with a movement speed of the target for every line and a sensing charge is output by being amplified and processed by a readout register at the end. As the sensing charge is accumulated by a time-delayed integration step, an image quality may be further enhanced. The TDI line sensor has an advantage in that a clear image can be obtained even in a dark illumination by a process of sensing multiple times and accumulating sensing charges.

There is a necessity to expand the range of brightness by making a bright portion brighter and a dark portion darker of the image obtained from the image sensor using the TDI line scan method so that the image becomes more similar to what the human eye sees.

SUMMARY

An object of an exemplary embodiment of the present disclosure is to provide a TDI image sensor which is capable of adjusting an exposure time to obtain a clearer image and an inspection system including the same.

Further, an object of an exemplary embodiment of the present disclosure is to provide a TDI image sensor which is capable of adjusting an exposure time to expand a dynamic range of the image to clearly express all the details of a bright part and a dark part in one image by obtaining and combining a short exposure (or a low brightness) image and a long exposure (or a high brightness) image for a same object to be captured and an inspection system including the same.

The object of the present disclosure is not limited to the above-mentioned objects and other objects and advantages of the present disclosure which have not been mentioned above can be understood by the following description and become more apparent from exemplary embodiments of the present disclosure. Further, it is understood that the objects and advantages of the present disclosure may be embodied by the means and a combination thereof in the claims.

In order to achieve the above-described objects, according to an aspect of the present disclosure, a TDI image sensor which is capable of adjusting an exposure time includes a pixel unit which includes a plurality of line sensors; a light blocking unit which blocks light from being incident into some of the plurality of line sensors; a scan controller which generates an exposure control signal based on an external line trigger signal, generates an internal line trigger signal based on the external line trigger signal and the exposure control signal, and controls the movement of charges of the plurality of line sensors based on the internal line trigger signal.

According to another aspect of the present disclosure, a TDI image sensor which is capable of adjusting an exposure time and an inspection system including the same include: a pixel unit which includes a plurality of line sensors in which incident of light is blocked by a light blocking unit in a part of each line sensor and the remaining part of each line sensor is exposed to light, a scan controller which controls exposure of the line sensor of the exposed part to the light with different exposure times to generate a sensing result for a first exposure time and a sensing result for a second exposure time; and an output unit which generates an image based on the sensing result for the first exposure time and the sensing result for the second exposure time.

According to the exemplary embodiment of the present disclosure, a TDI image sensor which is capable of adjusting an exposure time and an inspection system including the same obtain a clearer TDI image to maximize an applicable field for the TDI image sensor.

BRIEF DESCRIPTION OF THE DRAWINGS

FIG. 2 is a diagram illustrating a configuration of a pixel unit of FIG. 1 according to an exemplary embodiment of the present disclosure;

DETAILED DESCRIPTION OF THE EMBODIMENT

Figure 1:
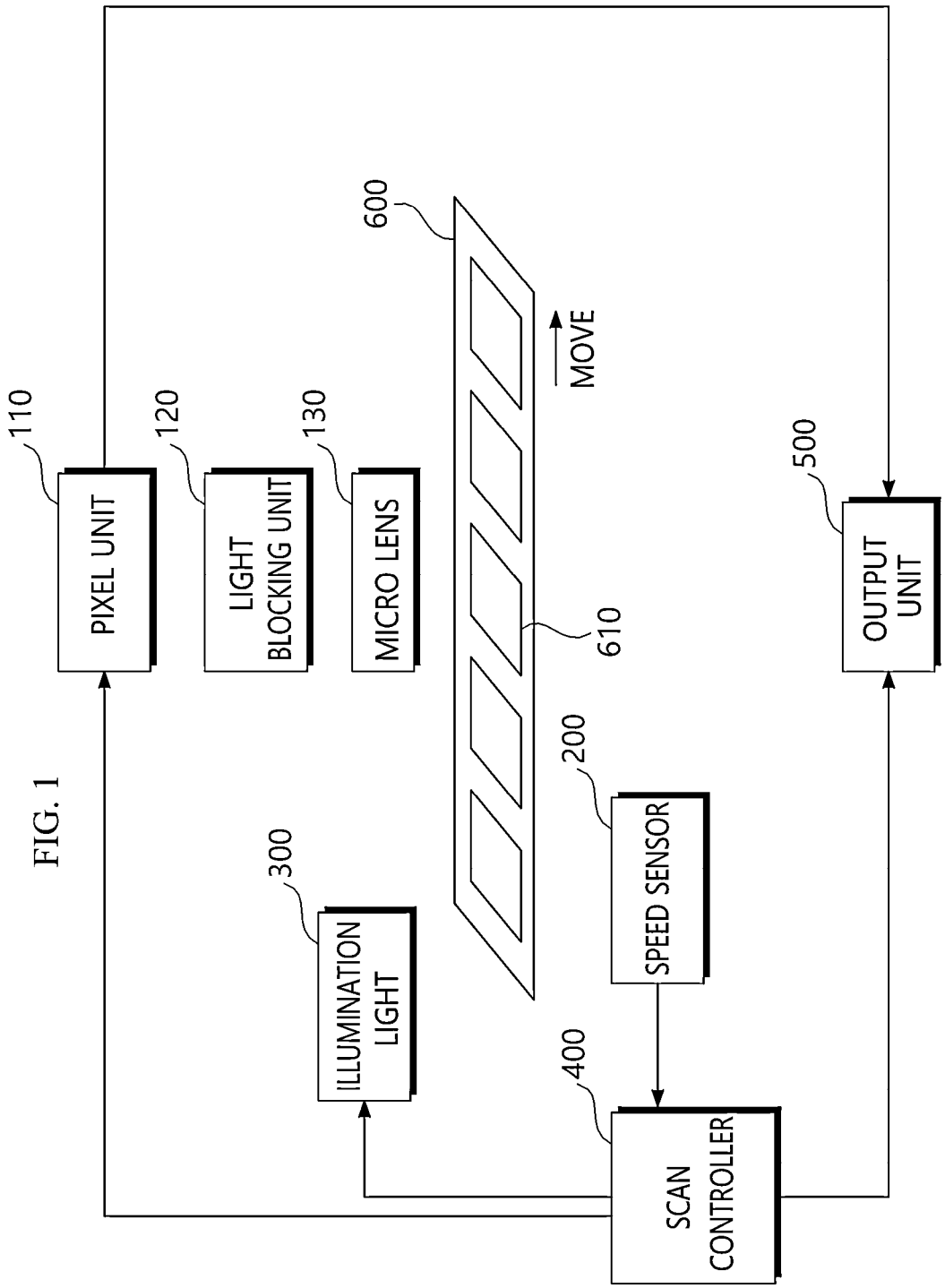
FIG. 1 is a view illustrating a schematic configuration of a TDI image sensor which is capable of adjusting an exposure time according to an exemplary embodiment of the present disclosure and an inspection system including the same.

The above-described objects, features and advantages will be described below in detail with reference to the accompanying drawings, and accordingly the technical spirit of the present disclosure may be easily implemented by those having ordinary skill in the art. When it is judged that specific description about known technologies related the present disclosure may unnecessarily obscure the essentials of the present disclosure, the detailed description will be omitted. Hereinafter, preferred embodiments according to the present disclosure will be described in detail with reference to the accompanying drawings. In the drawings, like reference numerals denote like components.

As described above, the TDI image sensor which is capable of adjusting an exposure time according to the exemplary embodiment of the present disclosure and the inspection system including the same are techniques to expand a dynamic range of the TDI image so as to express the image acquired from the TDI image sensor such that a bright portion is made brighter and a dark portion is made darker to acquire a clearer image.

The TDI image sensor which is capable of adjusting an exposure time according to the exemplary embodiment of the present disclosure and the inspection system including the same for acquiring a clearer image acquire a long exposure image and a short exposure image for one object to be captured by one scan under the same illumination condition and combine the two images using a high dynamic range (HDR) technique to express details of the bright portion and the dark portion of one combined image to be clearer.

At this time, the HDR technique is a technique which acquires and combines short exposure and long exposure images for the same object to be captured to express clearly both a bright portion and a dark portion in one image to expand a dynamic range of the image.

In the present disclosure, HDR is mentioned as an example of a signal processing technique for generating a high quality image. However, the exemplary embodiment is provided for easy understanding and it should be understood that any of signal processing techniques for generating a high quality image using long exposure and short exposure image data obtained from the same object may also be used.

The following description is provided for a configuration and a method for acquiring a short exposure image and a long exposure image in the TDI image sensor which is capable of adjusting an exposure time according to the exemplary embodiment of the present disclosure and the inspection system including the same.

FIG. 1 is a view illustrating a schematic configuration of a TDI image sensor which is capable of adjusting an exposure time according to an exemplary embodiment of the present disclosure and an inspection system including the same.

Referring to FIG. 1, the TDI image sensor which is capable of adjusting an exposure time according to an exemplary embodiment of the present disclosure and the inspection system including the same may include a pixel unit 110, a light blocking unit 120, a micro lens 130, a speed sensor 200, an illumination light 300, a scan controller 400, and an output unit 500. At this time, the TDI image sensor may include a pixel unit 110, a light blocking unit 120, a micro lens 130, a speed sensor 200, a scan controller 400, and an output unit 500. Further, the pixel unit 110 may include the light blocking unit 120 and the micro lens 130 and the scan controller 400 may include the speed sensor 200.

The pixel unit 110 is a configuration which senses images and may be configured by an imaging device such as a charge coupled device. The pixel unit 110 may be configured by a plurality of line sensors configured by a plurality of imaging devices. Each of the plurality of line sensors may be disposed in a direction orthogonal to a movement direction of a scanning object 610, that is, a direction perpendicular to the scan direction.

The pixel unit 110 may be configured to accumulate a quantity of charges corresponding to an amount of light which passes through or is reflected from the scanning object 610 according to the time delayed integration (TDI) method while moving a column direction of each line sensor.

The light blocking unit 120 may be disposed on a front surface of some of line sensors so as to prevent the light entering from the scanning object 610 from being incident in some of the line sensors which are configured in the pixel unit 110. For example, the light blocking unit 120 may be disposed on the front surface of each line sensor so as to prevent the light from being incident into a portion corresponding to half the line sensors. In the present disclosure, for the convenience of description, an exemplary embodiment in which half the line sensors is light-shielded has been mainly described. However, if necessary, ⅓, ¼, or ⅔ of the line sensors may be light-shielded or the line sensors may also be alternately light-shielded one by one.

The light blocking unit 120 may be implemented by a metal light shielding layer (illustrated in FIGS. 3A to 3D). For example, the metal light shielding layer of the light blocking unit 120 may be disposed on the front surface of the corresponding line sensor so as to allow the light to be alternately incident in some of the line sensors. For example, the metal light shielding layer of the light blocking unit 120 may be disposed on the front surface of each line sensor so as to prevent the light from being incident in half the line sensors.

The micro lens 130 may be configured to refract light entering from the scanning object 610 to be focused on an opening portion of the pixel in the pixel unit 110. The micro lens 130 may be disposed on the front surface of the light blocking unit 120.

The speed sensor 200 may be configured to detect a moving speed of a conveyer device 600 which conveys an object 610 to be scanned. For example, the speed sensor 200 may detect a moving speed of the conveyer device 600 to provide the moving speed to the scan controller 400. That is, an interval of external line trigger signals L_pe generated whenever the conveyer device 600 moves a predetermined distance (for example, 50 µm) may be measured to detect the moving speed. The conveyer device 600 used in the present disclosure may be any device which is suitable to move the scanning object 610 to be scanned by the image sensor and a typical example thereof may be a linear stage.

The illumination light 300 may be configured to emit light incident into the pixel unit 110.

The scan controller 400 may generate an internal line trigger signal L_pi based on an external line trigger signal L_pe which is input from outside and control the movement of the charges of the pixel unit 110 based on the internal line trigger signal L_pi. The external line trigger signal L_pe is set to be automatically generated whenever the conveyer device 600 which moves the scanning object 610 moves a predetermined distance and is provided to the image sensor to trigger the charges to move to the next line sensor. Therefore, the movement of the scanning object 610 and the charge accumulation in the corresponding line sensor may be synchronized.

For example, the scan controller 400 may generate the internal line trigger signal L_pi whenever the external line trigger signal L_pe is input and additionally generate an internal line trigger signal L_pi between the internal line trigger signals L_pi generated by the external line trigger signal L_pe. In other words, the scan controller 400 may generate an exposure control signal E_p after elapsing a predetermined time whenever the external line trigger signal L_pe is input and combine the external line trigger signal L_pe and the exposure control signal E_p (for example, by an OR operation) to generate a final internal line trigger signal L_pi.

To be more specific, when two external line trigger signals L_pe are input, the scan controller 400 may generate three internal line trigger signals L_pi. A first internal line trigger signal L_pi and a third internal line trigger signal L_pi may be generated by input of the external line trigger signal L_pe and a second internal line trigger signal L_pi may be generated at a timing set by a user. In other words, while two external line trigger signals L_pe are input, the exposure control signal E_p may be additionally generated at a specific timing therebetween. The specific timing may be determined by a value which is set in advance by the user. In other words, when two external line trigger signals L_pe are input, the scan controller additionally may generate the exposure control signal E_p at a specific timing between two external line trigger signals. The specific timing may be determined by a value which is set in advance by the user.

The output unit 500 may output a sensing result provided from the pixel unit 110 by the control of the scan controller 400. An inspection system which detects defects of the scanning object may be configured by using the sensing result. According to an exemplary embodiment of the present disclosure, the output unit 500 may include appropriate buffer, amplifier, analog digital converter (ADC), HDR processing circuit and the like to receive and amplify the accumulated and transferred charges by the pixel unit 110 for each column and convert them into digital signals and process the digital signals. At this time, the output unit 500 may acquire a first image by a first exposure time between the first external line trigger signal L_pe and the exposure control signal E_p and a second image by a second exposure time between the exposure control signal E_p and a next external line trigger signal L_pe to combine the first and second images to output a high dynamic range (HDR) image.

At this time, the first exposure time may be different from the second exposure time. The long exposure image which is generated by a longer exposure time between the first and second exposure times may be an image for a region which has a lower surface reflectance to be captured darker even under the same illumination. The short exposure image which is generated by a shorter exposure time may be an image for a region which has a high surface reflectance, like a metal, to be captured very brightly under the same illumination. The HDR image may be an image generated by combining the long exposure image and the short exposure image.

FIG. 2 is a diagram illustrating a configuration of a pixel unit of FIG. 1 according to an exemplary embodiment of the present disclosure.

Referring to FIG. 2, in the TDI image sensor which is capable of adjusting an exposure time according to the exemplary embodiment of the present disclosure, one pixel 1 may be configured by at least two storages. Further, one pixel may be configured by one storage. In FIG. 2, for the convenience of description, a first storage is denoted by 2a and a second storage is denoted by 2b. In one pixel, different images corresponding to the number of storages may be obtained. One storage may be configured by one sensing device such as a charge coupled device (CCD). In FIG. 2, it is illustrated that one pixel 1 is configured by the first storage 2a and the second storage 2b.

In the pixel unit 110, N line sensors each of which is configured by M imaging devices may be provided to be parallel to the scanning direction. That is, imaging devices in an M×N matrix may be configured.

Generally, one image device configures one pixel 1, but the pixel unit 110 may be implemented such that a plurality of imaging devices configures one pixel 1.

The storages which configures one pixel 1 may be disposed in a scan direction, that is, a column direction of the M×N matrix and at least two storages configure one pixel.

The pixel unit may be configured by a time delayed integration (TDI) image sensor and one pixel may be configured by at least two storages formed in the column direction. That is, one pixel may be configured by a plurality of imaging devices disposed in the column direction.

The pixel unit 110 may be configured to move and accumulate the sensing charges in the column direction of each line sensor according to the TDI method to integrate image signal charges. The pixel unit 110 may be configured to move the charges accumulated in the unit of storages in the column direction by the driving control of the scan controller 400.

FIGS. 3A to 3D are views for explaining a configuration in which a pixel unit, a light blocking unit, and a micro lens of FIG. 1 are combined, according to an exemplary embodiment of the present disclosure.

As illustrated in FIGS. 2, 3A to 3D, the light blocking unit 120 may be configured by a metal mask. The light blocking unit 120 may be configured to accept light incident into a part (for example, half, 3/5, or 2/3) of each line L1, L2, L3, and L4 and block light from the remaining part (for example, half, 2/5, or 1/3) in the pixel unit 110.

The micro lens 130 may be provided at an upper end of the exposed area of the light blocking unit 120. The micro lens 130 is a configuration which enhances light incident into a line sensor portion exposed by the light blocking unit 120. The micro lens 130 may be provided in every exposed area of the light blocking unit 120 to allow more incident light to be incident into the pixel unit 110. As illustrated in FIG. 3D, voltages V1, V2, and V3 of CCDs are sequentially applied to so that charges accumulated in a CCD move to an adjacent CCD (or charges accumulated in a part of the CCD move to the remaining part of the CCD) and charges sensed by repeating this operation are output from a charge storage node FD.

Figure 4:
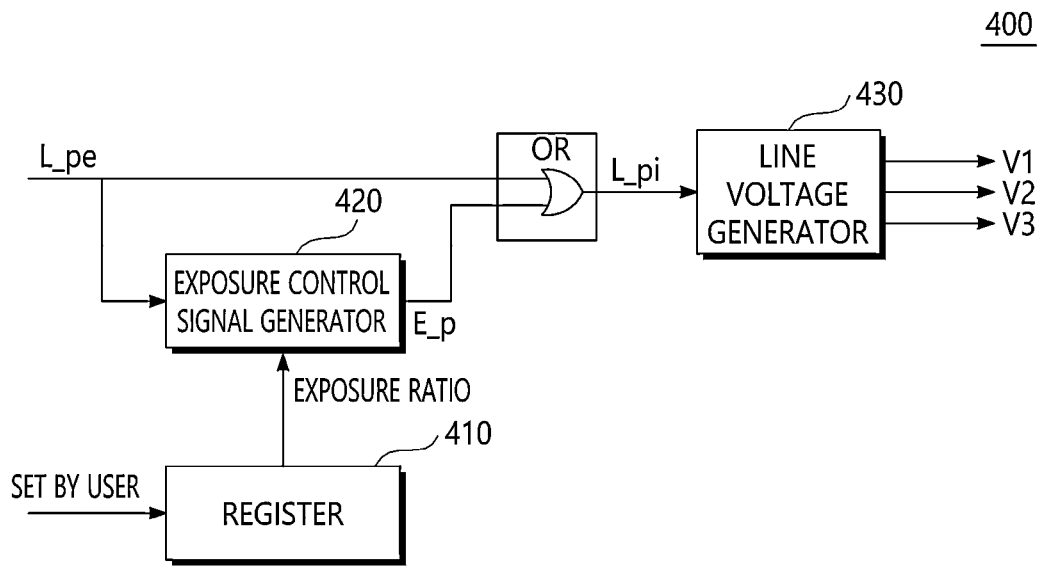
FIG. 4 is a view illustrating a schematic configuration of a scan controller of FIG. 1 according to an exemplary embodiment of the present disclosure.

FIG. 4 is a view illustrating a schematic configuration of a scan controller of FIG. 1 according to an exemplary embodiment of the present disclosure.

As illustrated in FIG. 4, the scan controller 400 may include a register 410, an exposure control signal generator 420, and a line voltage generator 430.

The register 410 may store a digital value in accordance with an exposure time ratio set by the user and provide the stored value to the exposure control signal generator 420. A light exposure time of the line sensor in accordance with the exposure time ratio set by the user may be calculated using the register 410.

The exposure control signal generator 420 may generate the exposure control signal E_p based on the output value of the register 410 and the external line trigger signal L_pe input from the outside. For example, when the external line trigger signal L_pe is input and the exposure time set by the user elapses, the exposure control signal generator 420 may generate and output the exposure control signal E_p. At this time, the output signal stored in the register 410 refers to an exposure time ratio of two images and is converted into a timing to generate the exposure control signal E_p based on this value. As a result, the exposure control signal generator 420 may adjust a predetermined time in accordance with the output signal of the register 410 and when a predetermined time adjusted after inputting the external line trigger signal L_pe elapses, generates and outputs the exposure control signal E_p.

The internal line trigger signal L_pi may be generated based on the input external line trigger signal L_pe and the exposure control signal E_p generated therein.

At this time, the internal line trigger signal L_pi may be generated in a digital logic, for example, in an OR gate.

The line voltage generator 430 may generate a plurality of line voltages V1, V2, and V3 which are input to each line sensor, based on the internal line trigger signal L_pi.

Figure 5:
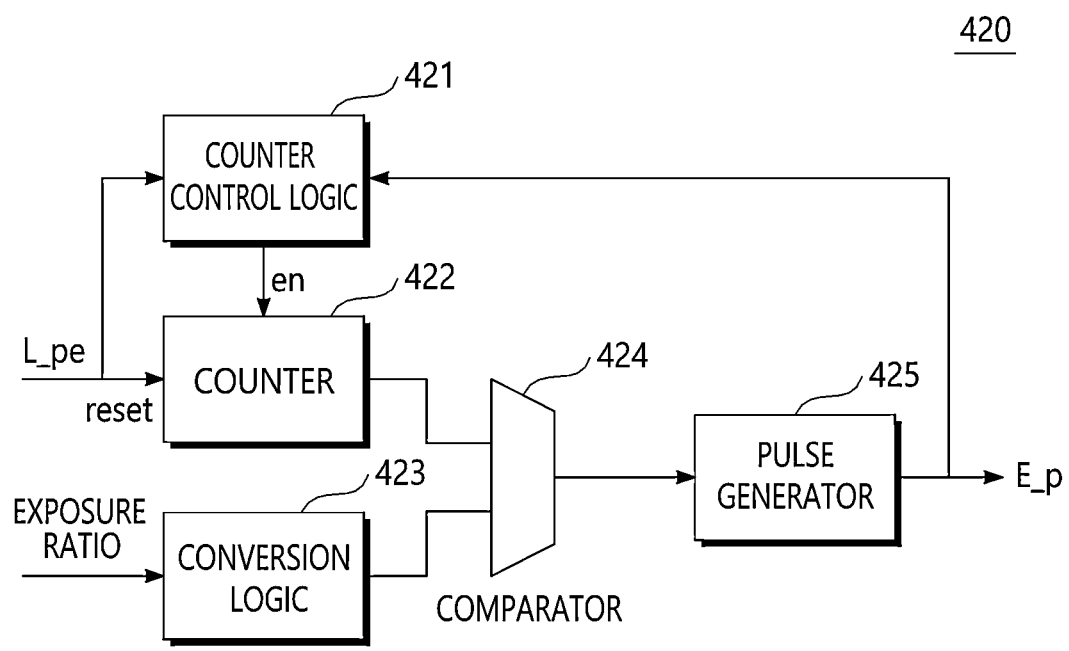
FIG. 5 is a view illustrating a schematic configuration of an exposure control signal generator of FIG. 4 according to an exemplary embodiment of the present disclosure.

FIG. 5 is a view illustrating a schematic configuration of an exposure control signal generator of FIG. 4 according to an exemplary embodiment of the present disclosure.

As illustrated in FIG. 5, the exposure control signal generator 420 may include a counter control logic 421, a counter 422, a conversion logic 423, a comparator 424, and a pulse generator 425.

The counter control logic 421 may receive an external line trigger signal L_pe and the exposure control signal E_p and output a counter active signal en. For example, when the external line trigger signal L_pe is input, the counter control logic 421 may output the counter active signal en until the exposure control signal E_p is input. That is, when the external line trigger signal L_pe is input, the counter control logic 421 may enable the counter active signal en and when the exposure control signal E_p is input, disable the counter active signal en. At this time, when the counter active signal en is enabled, the counter active signal en may be a high digital logic level and when the counter active signal en is disabled, the counter active signal en may be a low digital logic level. The counter control logic 421 may be implemented by an S-R latch circuit.

The counter 422 may receive the counter active signal en and output a count value. For example, the counter 422 may count to increase a value by one only during a period in which the counter active signal en is enabled to be a high level and output a count value.

When the external line trigger signal L_pe is input, a count value of the counter 422 is reset and the counter 422 may count to increase a value by one during a period in which the counter active signal en is enabled to be a high level.

The conversion logic 423 may include a calculating function to convert into a number of clock pulses to up-count the counter 422, based on the exposure ratio stored in the register 410 of the scan controller of FIG. 4. For example, it may correspond to the number of clock pulses to determine a timing to generate the exposure control signal E_p after inputting the external line trigger signal L_pe.

The comparator 424 may output a result of comparing a value of the counter 422 which is up-counted during the period in which the counter active signal en is enabled to be a high level and the number of clock pulses calculated based on the exposure ratio.

For example, when the value of the counter 422 and an output value of the conversion logic 423 are equal, the comparator 424 may output a comparison result signal R_c which is a high level.

For example, when the number of clock pulses calculated based on the exposure ratio is 256 and a value of the counter which is up-counted during the counter active period is 256, the comparator 424 may output a comparison result signal R_c which is a high level.

The pulse generator 425 receives the comparison result signal R_c and outputs the exposure control signal E_p. For example, when the comparison result signal R_c is a high level, the pulse generator 425 may output the exposure control signal E_p.

Figure 6:
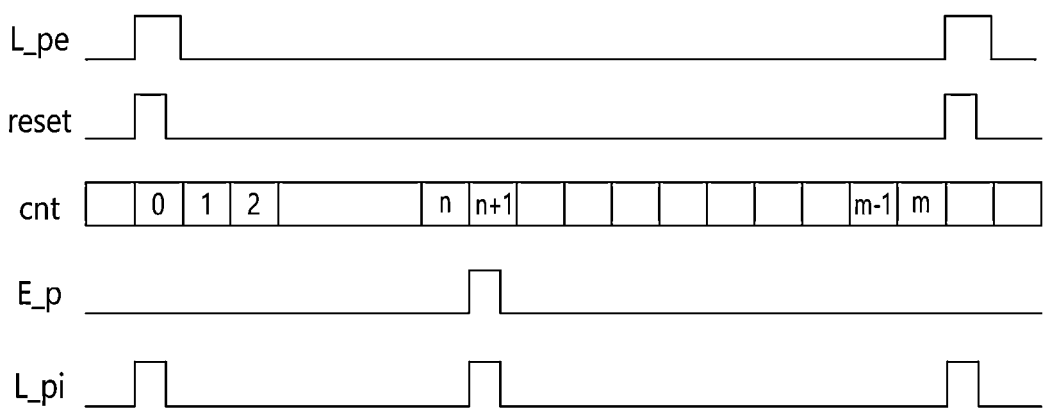
FIG. 6 is a view for explaining an operation of an exposure control signal generator of FIG. 5.

FIG. 6 is a view for explaining an operation of an exposure control signal generator of FIG. 5.

Referring to FIG. 6, an operation of the exposure control signal generator 420 illustrated in FIG. 5 will be described as follows.

A count value is an output signal of the counter 422 in the exposure control signal generator 420 and may be a count value which is up-counted during a period in which the counter active signal en generated in the counter control logic 421 by the external line trigger signal L_pe and the exposure control signal E_p is enabled. That is, the counter 422 may up-count during the period in which the counter active signal en is enabled and then stop counting when the counter active signal en is disabled and then wait until a next external line trigger signal L-pe is input.

Here, when the count value is n, the exposure control signal E_p is generated. n may be a number calculated by the conversion logic 423 based on the exposure ratio stored in the register 410 of the scan controller. For example, when a cycle of the external line trigger signal L-pe is 100 with respect to a counter clock, if the exposure ratio is set to be 25, the n value may be 25. To be more specific, when the external line trigger signal L_pe is input, the counter is reset to 0 and the counter active signal is enabled to start up-counting. When the count value is 25, if the exposure control signal E_p is output, the counter active signal is disabled and the counter 422 stops the operation until the next external line trigger signal L_pe is input. As a result, immediately after the external line trigger signal L_pe is input, the charges accumulated in each pixel of the TDI sensor move line by line and when the count value is 25, move again and immediately after a next external line trigger signal L_pe is input, move again. Here, when the cycle of the external line trigger signal L_pe corresponds to approximately 100 counter clock pulses, a short exposure image which is exposed by 25% (¼) and a long exposure image which is exposed by 75% (¾) may be obtained.

In the above-described exemplary embodiment, an example that the interval between the external line trigger signals is divided into 5 equal parts and is set at an exposure time ratio of 2:3 or 1:4 has been described. However, this is merely an example and those skilled in the art may easily understand that the interval of the external line trigger signal L_pe may be divided into an arbitrary integer number of equal parts.

Further, the interval between the external line trigger signals is ideally constant, actually, there may be a slight jitter. Therefore, a previous external line trigger signal interval may be measured and equally divided by an integer to convert the interval into an integer value corresponding to the timing of generating the exposure control signal. Further, according to still another exemplary embodiment, the previous external line trigger signal interval may be measured and divided by 1, 5, or 10 and used for the output of an oscillator signal OSC. According to another exemplary embodiment, the external line trigger signal interval may be measured several times (for example, three times or five times) and an average may be calculated to use the average for the division or oscillator signal (OSC) output. Alternatively, the signal interval value may be received from the user to be used for division by an integer and the oscillator signal (OSC) output.

Figure 7:
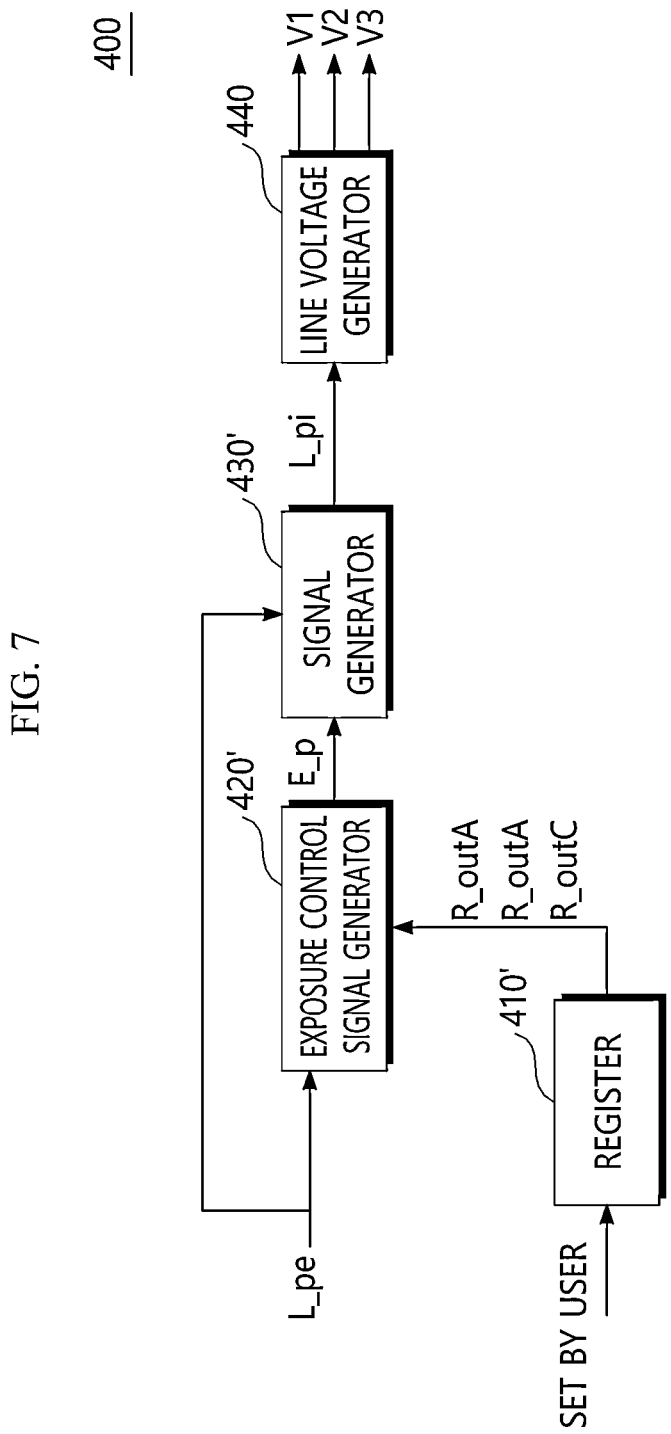
FIG. 7 is a view illustrating a schematic configuration of a scan controller according to another exemplary embodiment of the present disclosure.

FIG. 7 is a view illustrating a schematic configuration of a scan controller according to another exemplary embodiment of the present disclosure.

As illustrated in FIG. 7, the scan controller 400 may include a register 410', an exposure control signal generator 420', a signal generator 430', and a line voltage generator 440.

The register 410' may store digital signals R_outA, R_outB, and R_outC in accordance with an exposure time ratio set by the user and provides the stored value to the exposure control signal generator 420'. A light exposure time of the line sensor in accordance with the exposure time ratio set by the user may be determined using the register 410'.

The exposure control signal generator 420' may generate the exposure control signal E_p based on the output signals R_outA, R_outB, and R_outC of the register 410' and the external line trigger signal L_pe input from the outside. For example, when the external line trigger signal L_pe is input and the exposure time set by the user elapses, the exposure control signal generator 420' may generate and output the exposure control signal E_p. At this time, the output signals R_outA, R_outB, and R_outC of the register 410' may adjust a predetermined time of the exposure control signal generator 420'. As a result, the exposure control signal generator 420' may adjust a predetermined time in accordance with the output signals R_outA, R_outB, and R_outC of the register 410' and generate and output the exposure control signal E_p when an adjusted predetermined time elapses after inputting the external line trigger signal L_pe.

The signal generator 430' may generate the internal line trigger signal L_pi based on the external line trigger signal L_pe and the exposure control signal E_p. For example, the signal generator 430' may generate the internal line trigger signal L_pi whenever the external line trigger signal L_pe and the exposure control signal E_p are input.

At this time, the signal generator 430' may be implemented by a digital logic, for example, an OR gate.

The line voltage generator 440 may generate a plurality of line voltages V1, V2, and V3 which are input to each line sensor based on the internal line trigger signal L_pi.

Figure 8:
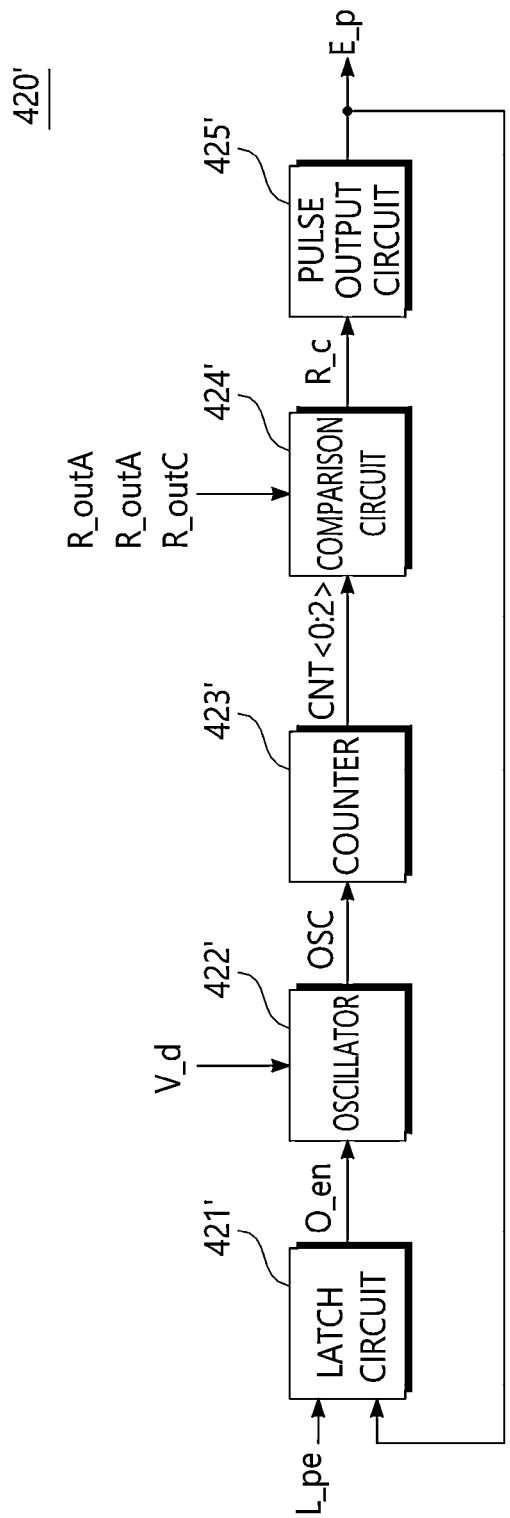
FIG. 8 is a view illustrating a schematic configuration of an exposure control signal generator according to another exemplary embodiment of the present disclosure.

FIG. 8 is a view illustrating a schematic configuration of an exposure control signal generator according to another exemplary embodiment of the present disclosure.

As illustrated in FIG. 8, the exposure control signal generator 420' may include a latch circuit 421', an oscillator 422', a counter 423', a comparison circuit 424', and a pulse output circuit 425'.

The latch circuit 421' may receive an external line trigger signal L_pe and the exposure control signal E_p and output an oscillator active signal O_en. For example, when the external line trigger signal L_pe is input, the latch circuit 421' may enable the oscillator active signal O_en until the exposure control signal E_p is input. That is, when the external line trigger signal L_pe is input, the latch circuit 421' may enable the oscillator active signal O_en and when the exposure control signal E_p is input, disable the oscillator active signal O_en. At this time, when the oscillator active signal O_en is enabled, the oscillator active signal O_en may be a high digital logic level and when the oscillator active signal O_en is disabled, the oscillator active signal O_en may be a low digital logic level. The latch circuit 421' may be implemented by an S-R latch circuit.

The oscillator 422' may receive the oscillator active signal O_en and a speed sensing signal V d and output the oscillator signal OSC. For example, the oscillator 422' may output the oscillator signal OSC which is periodically shifted only in a period in which the oscillator active signal O_en is enabled to a high level. For example, the oscillator signal OSC is a signal which is periodically shifted between a high level and a low level. At this time, the oscillator 422' which generates the oscillator signal OSC which is periodically shifted may vary the cycle of the oscillator signal OSC based on a speed sensing signal V d. The speed sensing signal V d may be an output signal of the speed sensor 200 of FIG. 1 or a signal corresponding to an input speed of the external line trigger signal L_pe. Further, the speed sensing signal V d may be a value set by the user.

The oscillator 422' may generate the oscillator signal OSC at a cycle corresponding to a value obtained by dividing an input cycle of the external line trigger signal L_pe by an integer.

The counter 423' may receive the oscillator signal OSC and output a counter signal CNT<0:2>. For example, whenever the oscillator signal OSC is shifted to a high level, the counter 423' may increase a counting value of the counter signal CNT<0:2>. To be more specific, when the oscillator signal OSC is shifted to a first high level, the counter 423' may output a counter signal CNT<0:2> having a counting value (1, 0, 0). When the oscillator signal OSC is shifted to a second high level, the counter 423' may output a counter signal CNT<0:2> having a counting value (1, 1, 0). When the oscillator signal OSC is shifted to a third high level, the counter 423' may output a counter signal CNT<0:2> having a counting value (1, 1, 1). At this time, the high level is denoted by 1 and the low level is denoted by 0.

The comparison circuit 424' receives first to third delay control signals R_outA, R_outB, and R_outC and the counting signal CNT<0:2> and outputs a comparison result signal R_c.

For example, when the first to third delay control signals R_outA, R_outB, and R_outC and the counting signal CNT<0:2> are the same digital logic level, the comparison circuit 424' may output a comparison result signal R_c which is a high level. To be more specific, when levels of the first to third delay control signals R_outA, R_outB, and R_outC and a level of the counting signal CNT<0:2> are equal to each other, the comparison circuit 424' may output a comparison result signal R_c which is a high level.

When all the first to third delay control signals R_outA, R_outB, and R_outC are high levels, if the counting signal CNT<0:2> is (1, 1, 1), the comparison circuit 424' may output a comparison result signal R_c which is a high level.

The pulse output circuit 425' may receive the comparison result signal R_c and output the exposure control signal E_p. For example, when the comparison result signal R_c is a high level, the pulse output circuit 425' may output the exposure control signal E_p.

Figure 9:
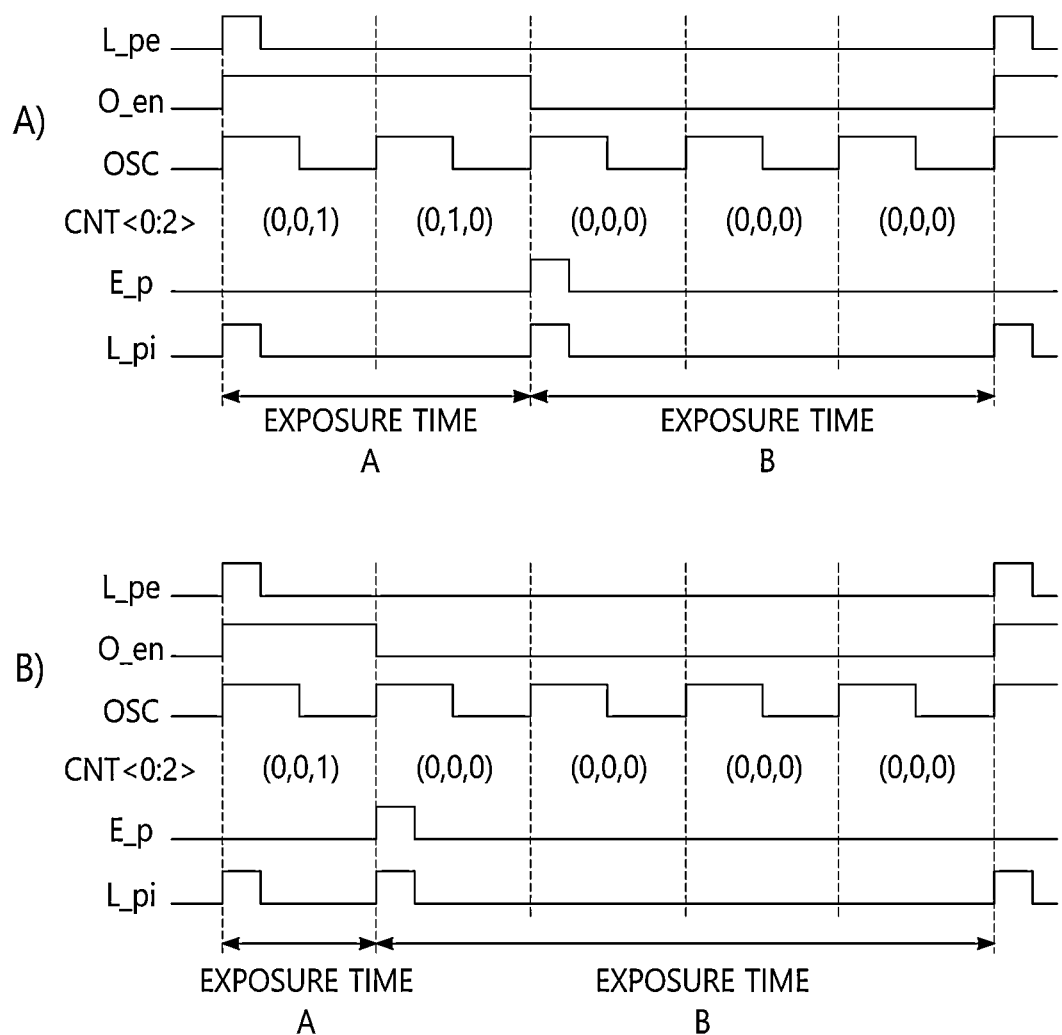
FIG. 9 is a view for explaining an operation of an exposure control signal generator according to another exemplary embodiment of the present disclosure.

Referring to FIG. 9, an operation of the exposure control signal generator 420' illustrated in FIG. 8 will be described as follows.

In FIG. 9A, it is assumed that a first delay control signal R_outA is a low level, a second delay control signal R_outB is a high level, and a third delay control signal R_outC is a low level. Further, in FIG. 9, it is assumed that an oscillator signal having a cycle corresponding to ⅕ of an input cycle of the external line trigger signal L_pe is generated. The oscillator 422' may generate an oscillator signal OSC which is five times faster than an input cycle of the external line trigger signal L_pe based on the speed sensing signal V d. At this time, the oscillator 422' may vary the cycle of the oscillator signal OSC based on the speed sensing signal V d.

When the external line trigger signal L_pe is input, the latch circuit 421' enables the oscillator active signal O_en to a high level.

At this time, the first external line trigger signal L_pe is input, a first internal line trigger signal L_pi is generated.

When the oscillator active signal O_en is enabled to a high level, the oscillator 422' generates an oscillator signal OSC which is periodically shifted between the high level and the low level.

When the oscillator signal OSC is shifted to a first high level, the counter 423' may output a counter signal CNT<0:2> having a counting value (0, 0, 1).

When the oscillator signal OSC is shifted to a second high level, the counter 423' may output a counter signal CNT<0:2> having a counting value (0, 1, 0).

At this time, since the first to third delay control signals R_outA, R_outB, and R_outC are (0, 1, 0), when a counting value of the counting signal CNT<0:2> is (0, 1, 0), the comparison circuit 424' outputs a comparison result signal R_c which is a high level.

The pulse output circuit 425' receives the comparison result signal R_c which is a high level to generate the exposure control signal E_p.

At this time, when the exposure control signal E_p is generated, a second internal line trigger signal L_pi is generated.

When the exposure control signal E_p is output, the latch circuit 421' disables the oscillator active signal O_en to a low level and the counter 423' initializes the counter signal CNT<0:2>. At this time, the counting value of the initialized counter signal CNT<0:2> may be (0, 0, 0). Further, the initialized counter signal CNT<0:2> maintains an initialized value until a second external line trigger signal L_pe is input.

When the second external line trigger signal L_pe is input, the oscillator active signal O_en is enabled to a high level and the third internal line trigger signal L_pi is generated.

As a result, the interval between the first external line trigger signal L_pe and the second external line trigger signal L_pe may be equally divided by the oscillator signal OSC into five sections and the second internal line trigger signal L_pi may be generated in the second section (0, 1, 0) corresponding to the value (0, 1, 0) of the first to third delay control signals R_outA, R_outB, and R_outC set by the user.

Since the internal line trigger signal L_pi generated as illustrated in FIG. 9A determines an exposure time for light of each line of the pixel unit 110, the charges accumulated during a time between the first internal line trigger signal L_pi and the second internal line trigger signal L_pi, that is, an exposure time A may be moved and the charges accumulated during an exposure time B between the second internal line trigger signal L_pi and the third internal line trigger signal L_pi may be moved.

In FIG. 9B, it is assumed that a first delay control signal R_outA is a low level, a second delay control signal R_outB is a low level, and a third delay control signal R_outC is a high level.

When the external line trigger signal L_pe is input, the latch circuit 421' enables the oscillator active signal O_en to a high level.

At this time, when the first external line trigger signal L_pe is input, a first internal line trigger signal L_pi is generated.

When the oscillator active signal O_en is enabled to a high level, the oscillator 422' generates an oscillator signal OSC which is periodically shifted between the high level and the low level.

When the oscillator signal OSC is shifted to a first high level, the counter 423' may output a counter signal CNT<0:2> having a counting value (0, 0, 1).

At this time, since the first to third delay control signals R_outA, R_outB, and R_outC are (0, 0, 1), when a counting value of the counter signal CNT<0:2> is (0, 0, 1), the comparison circuit 424' outputs a comparison result signal R_c which is a high level.

The pulse output circuit 425' receives the comparison result signal R_c which is a high level to generate the exposure control signal E_p.

At this time, when the exposure control signal E_p is generated, a second internal line trigger signal L_pi is generated.

When the exposure control signal E_p is output, the latch circuit 421' disables the oscillator active signal O_en to a low level and the counter 423' initializes the counter signal CNT<0:2>. At this time, the counting value of the initialized counter signal CNT<0:2> may be (0, 0, 0). Further, the initialized counter signal CNT<0:2> maintains an initialized value until a second external line trigger signal L_pe is input.

When the second external line trigger signal L_pe is input, the oscillator active signal O_en is enabled to a high level and the third external line trigger signal L_pi is generated.

As a result, the interval between the first external line trigger signal L_pe and the second external line trigger signal L_pe is equally divided into five sections by the oscillator signal OSC and the second internal line trigger signal L_pi may be generated in the first section (0, 0, 1) corresponding to the value (0, 0, 1) of the first to third delay control signals R_outA, R_outB, and R_outC set by the user.

Since the internal line trigger signal L_pi generated as illustrated in FIG. 9B determines an exposure time for light of each line of the pixel unit 110, the charges accumulated during a time between the first internal line trigger signal L_pi and the second internal line trigger signal L_pi, that is, an exposure time A are moved and the charges accumulated during an exposure time B between the second internal line trigger signal L_pi and the third internal line trigger signal L_pi are moved.

As described with reference to FIGS. 9A and 9B, the TDI image sensor and the inspection system including the same may equally divide the interval between the first external line trigger signal and the second external line trigger signal by an integer into sections with a predetermined size (for example, 5 equal parts, 4 equal parts, 8 equal parts, or 16 equal parts) and generate an exposure control signal in any one of sections divided by the user to generate an internal line trigger signal whenever the external line trigger signal and the exposure control signal are input or generated.

In the above-described exemplary embodiment, an example that the interval between the external line trigger signals is divided into 5 equal parts to be set at an exposure time ratio of 1:4 has been described. However, this is merely an example and those skilled in the art may easily understand that the period of the external line trigger signal L_pe may be divided into an arbitrary integer number of parts (for example, 4 equal parts, 8 equal parts, 16 equal parts, or 32 equal parts).

Further, even though the interval between the external line trigger signals is ideally constant, actually, there may be a slight jitter. Therefore, a previous external line trigger signal interval may be measured and equally divided by an integer to vary a cycle of the oscillator signal OSC.

Further, according to still another exemplary embodiment, the previous external line trigger signal interval may be measured and divided by 1, 5, or 10 and used for the output of an oscillator signal OSC. According to another exemplary embodiment, the external line trigger signal interval is measured several times (for example, three times or five times) and an average may be calculated to use the average for the division or oscillator signal (OSC) output. Alternatively, the external line trigger signal interval is measured several times (for example, one time, three times or five times) by clock counts and the previous value or average value (for example, 100 clocks) may be divided by integer (for example, 20 clocks: 80 clocks) according to a signal interval value (for example, 1:4) received from a user to be used to determine short and long exposure times.

Figure 10:
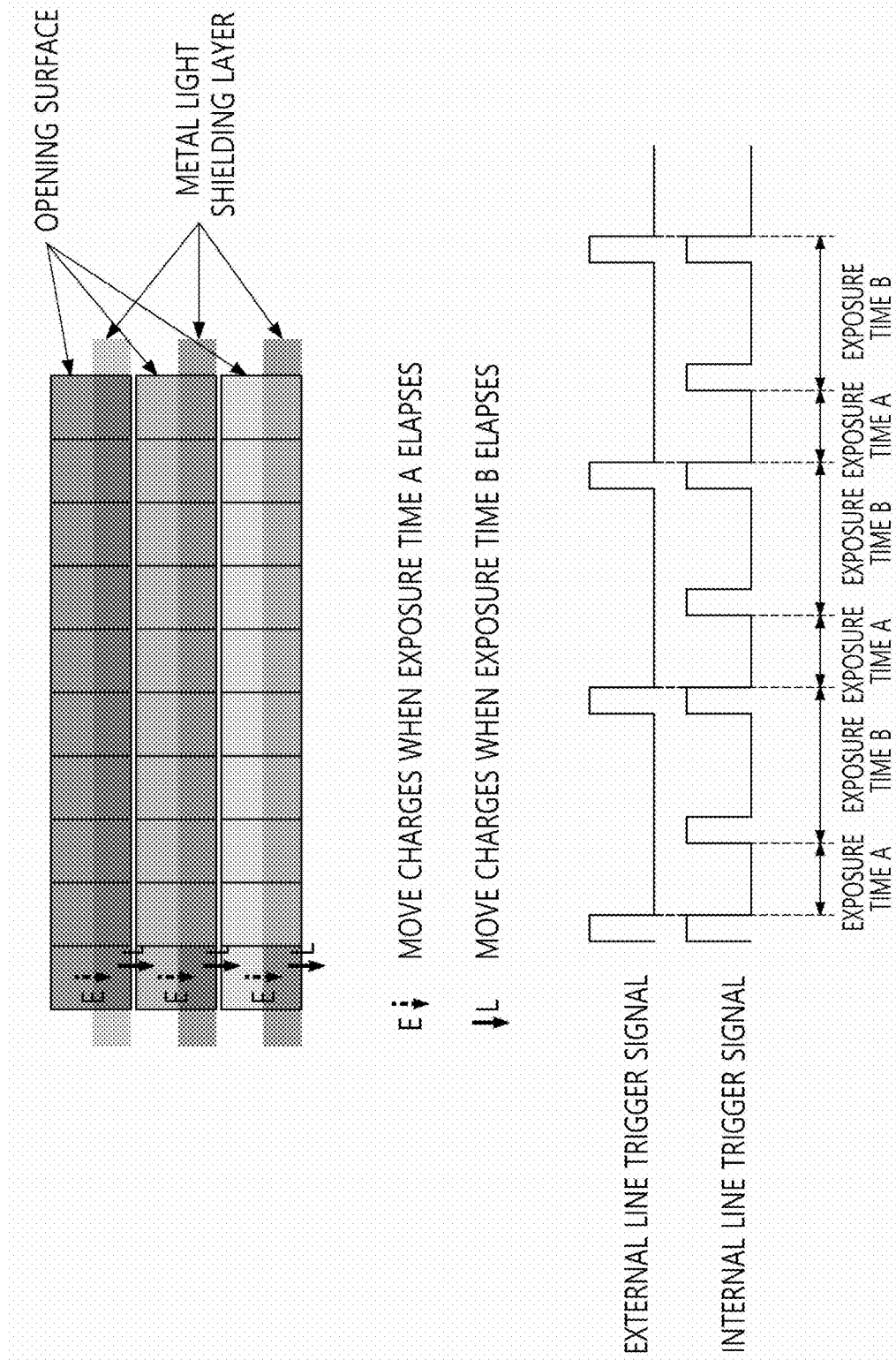
FIG. 10 is a view for explaining an operation of a TDI image sensor which is capable of adjusting an exposure time according to an exemplary embodiment of the present disclosure and an inspection system including the same.

FIG. 10 is a view for explaining an operation of a TDI image sensor which is capable of adjusting an exposure time according to an exemplary embodiment of the present disclosure.

FIG. 10 is a view for explaining charge movement of line sensors by an internal line trigger signal.

As illustrated in FIG. 10, whenever the internal line trigger signal L_pi is generated, repeatedly, charges are moved from a part of the line sensor (for example, a half, ⅖, or ⅓ of a lower portion) in which the light is blocked by the metal light shielding layer to an exposed part of the line sensor (for example, half, ⅗, and ⅔ of an upper portion) in which light is incident onto an open surface and charges are moved from the exposed part of the line sensor in which light is incident onto the open surface to the part of the line sensor in which the light is blocked by the metal light shielding layer.

Accordingly, the time when the part of the line sensor into which the light is incident is exposed to the light may be equal to the interval of the internal line trigger signal L-Pi.

Therefore, two accumulated charges with different exposure times may be transmitted to the column direction of each line sensor.

As a result, the TDI image sensor according to the exemplary embodiment of the present disclosure and the inspection system including the same sense two accumulated charges with different exposure times (for example, accumulated charges representing long exposure and short exposure) and combine the sensing results to generate a high dynamic range (HDR) image. At this time, a ratio of the exposure time A and the exposure time B may be set and stored in the register 410' by the user so that the HDR ratio may be easily changed.

Figure 11:
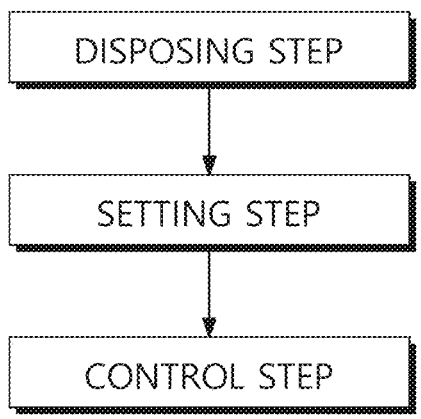
FIG. 11 is a view for explaining a control method of a TDI image sensor according to an exemplary embodiment of the present disclosure.
Figure 12:
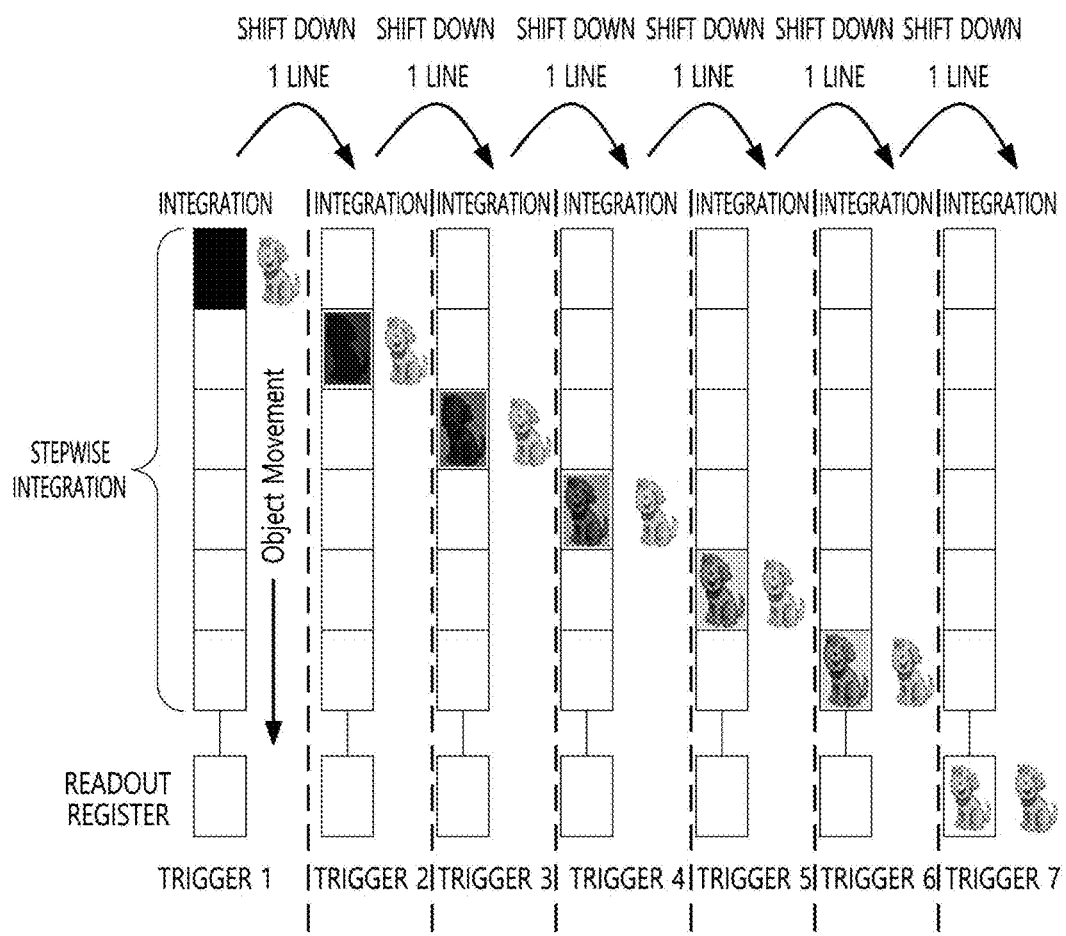
FIG. 12 is a view for explaining a scan principle of a normal TDI image sensor.

FIG. 11 is a view for explaining a control method of a TDI image sensor according to an exemplary embodiment of the present disclosure.

Referring to FIG. 11, the control method of the TDI image sensor of the present disclosure may include a disposing step, a setting step, and a control step.

Figure 3A:
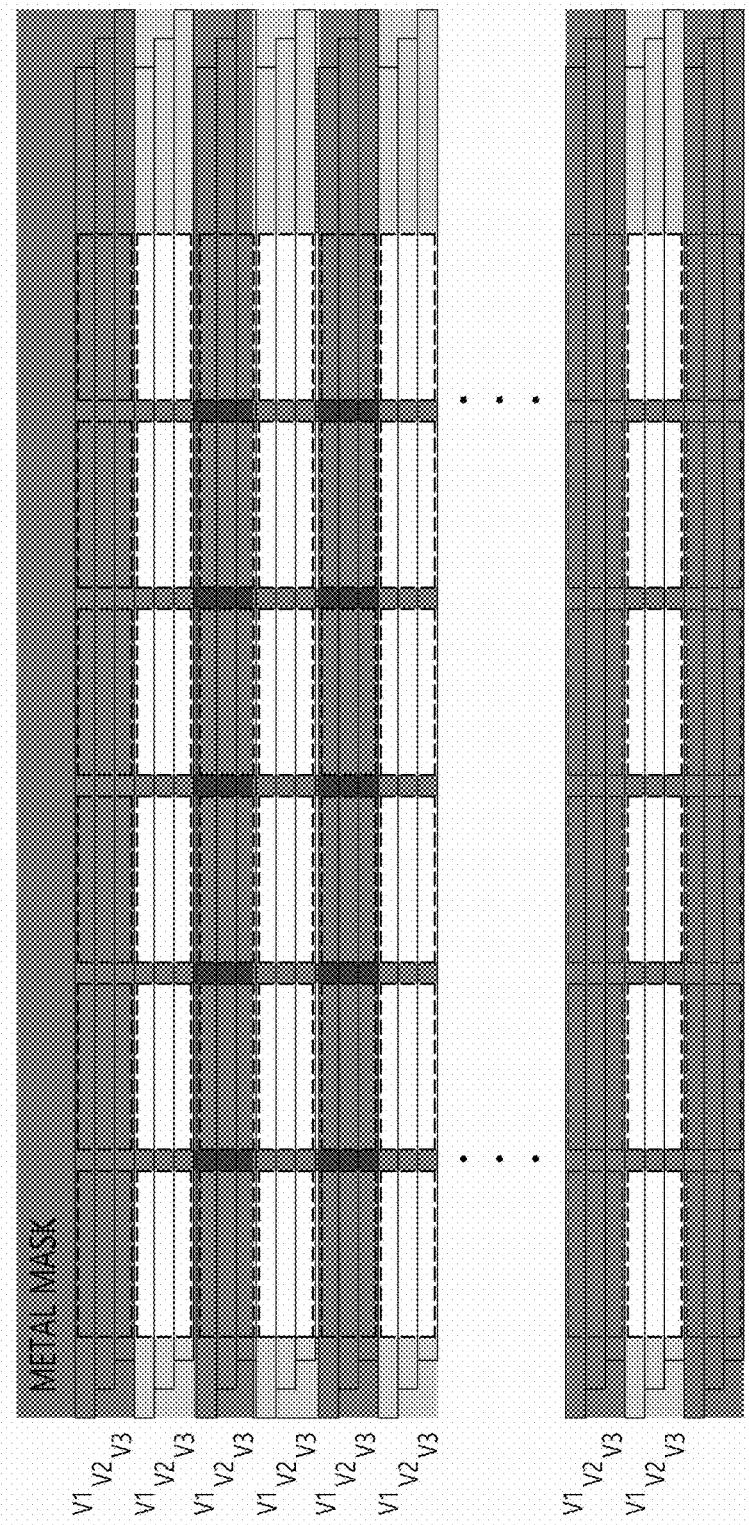
FIGS. 3A to 3D are views for explaining a configuration in which a pixel unit, a light blocking unit, and a micro lens of FIG. 1 are combined, according to an exemplary embodiment of the present disclosure.
Figure 3B:
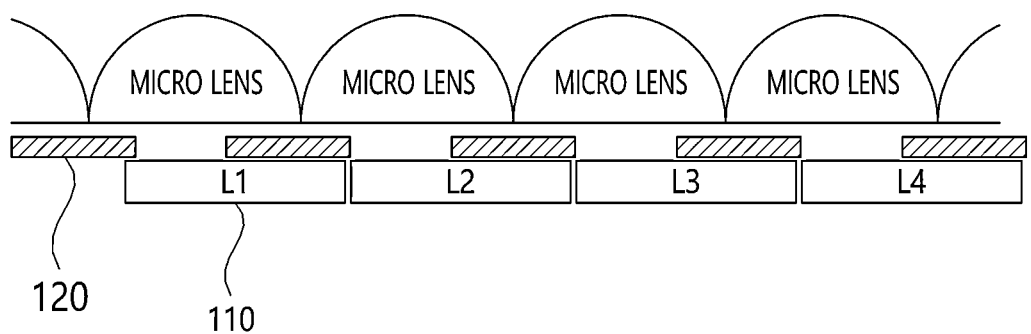
Figure 3C:
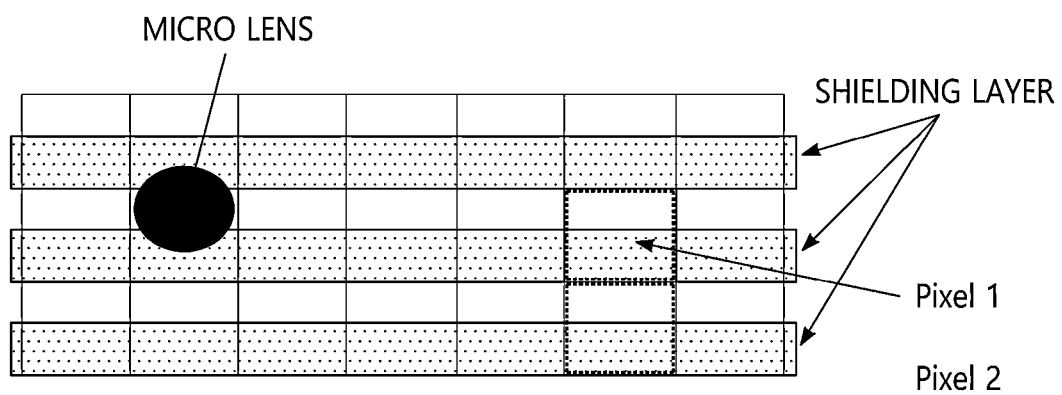
Figure 3D:
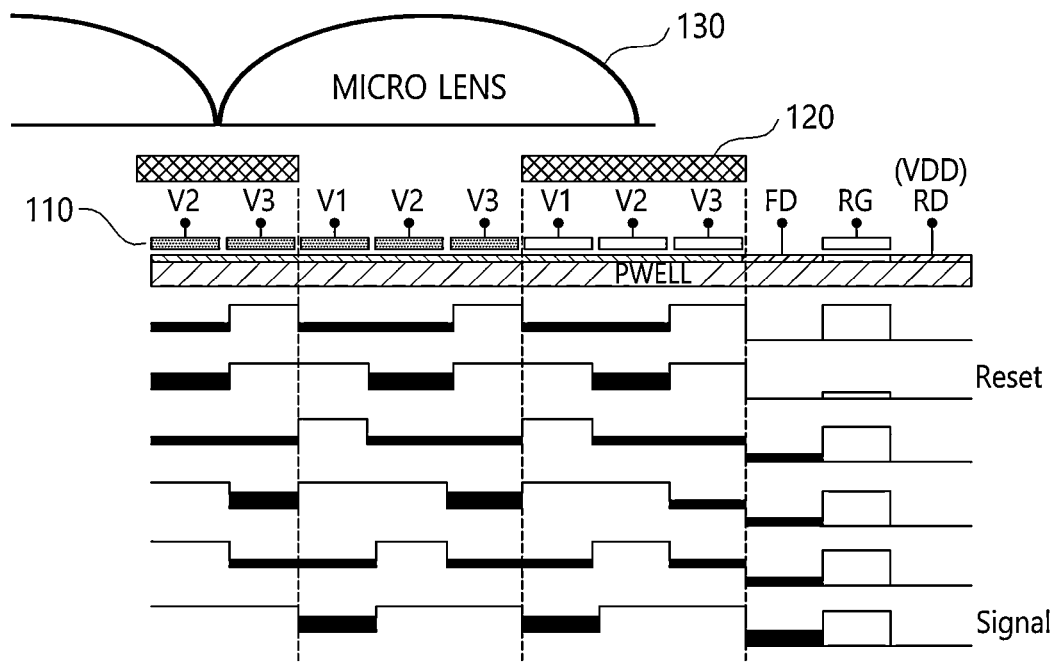

The disposing step, as illustrated in FIGS. 3A and 3B, may include a step of disposing a light blocking unit (a metal mask) in a part of a front surface of each line sensor. At this time, the disposing step may further include a step of disposing a micro lens in the remaining part of the line sensor in which the light blocking unit is not disposed.

The setting step is a step of storing information (for example, exposure times A and B or a ratio of the exposure times) corresponding to two exposure times of the remaining part of the line sensor in which the incident of the light is not blocked by the light blocking unit. The setting step may be a step of storing a value set by the user in the register illustrated in FIG. 4.

Further, in the setting step, an interval of the external line trigger signal, that is, an input timing is measured a predetermined number of times to calculate an average to be used to determine a cycle of the oscillator 422' or determine an exposure time. Therefore, the influence of the jitter which may be generated in the external line trigger signal may be minimized.

The control step is a step of alternately applying two exposure times to each line sensor and includes a step of generating an internal line trigger signal based on the external line trigger signal as illustrated in FIG. 10.

For example, the control step may include a first generation control step of generating a first internal line trigger signal when a first external line trigger signal is input, a second generation control step of generating a second internal line trigger signal when a time corresponding to a value stored in the register elapses after input of the first line trigger signal, and a third generation control step of generating a third internal line trigger signal when the second external line trigger signal is input.

Further, the control step includes a first exposure step of exposing a remaining part of the line sensor during an interval between the first internal line trigger signal and the second internal line trigger signal to light and moving the accumulated charges to a part of the line sensor in which the light blocking unit is disposed and a second exposure step of exposing the remaining part of the sensor during the interval between the second internal line trigger signal and the third internal line trigger signal to the light and moving accumulated charges to a part of the line sensor in which the light blocking unit is disposed. The first exposure step and the second exposure step may be repeatedly performed.

The first exposure step and the second exposure step are steps of accumulating charges by light with different exposure times. In the first and second exposure steps, an exposure step with a shorter exposure time may be a step for generating a short exposure image and an exposure step with a longer exposure time may be a step of generating a long exposure image.

The oscillator 422' illustrated in FIG. 8 may generate an oscillator signal OSC having a cycle corresponding to a value obtained by dividing the input cycle of the external line trigger signal L_pe by an integer and equally divide the interval between two external line trigger signals L_pe and select one or more of the divided sections as a value stored in the register 410'. An internal line trigger signal which separates the exposure time A and the exposure time B may be generated by the selected section.

Therefore, charges may be accumulated with different exposure times and the long exposure image and the short exposure image may be divided by the quantity of accumulated charges.

For example, as illustrated in FIG. 9B, when the oscillator signal OSC which is shifted by five cycles between the first external line trigger signal L_pe and the second external line trigger signal L_pe is generated and the internal line trigger signal L_pi is generated at a timing when the first cycle of the oscillator signal OSC ends, the short exposure image may be an image represented by a quantity of charges exposed to the light relatively for ⅕ and the long exposure image may be an image represented by a quantity of charges exposed to the light relatively for ⅘. At this time, the internal line trigger signal L_pi generated between the first external line trigger signal L_pe and the second external line trigger signal L_pe may be a value store in the register, that is, a value set by the user.

Accordingly, the TDI image sensor and the inspection system according to the exemplary embodiment of the present disclosure may generate a short exposure image and a long exposure image at a ratio set by the user.

the TDI image sensor according to the exemplary embodiment of the present disclosure and the inspection system including the same may generate a short exposure (or a low brightness) image and a long exposure (or a high brightness) image with different exposure times set by the user and generate a HDR image using the short exposure image and the long exposure image.

In the present invention, various substitutions, modifications, and changes can be made within the scope without departing from the technical spirit of the present invention by those skilled in the art, and as a result, the present invention is not limited to the aforementioned embodiments and the accompanying drawings.

What is claimed is:

1. A TDI image sensor which is capable of adjusting an exposure time, comprising:
a pixel unit which includes a plurality of line sensors in which in a part of each line sensor, incident light is blocked by a light blocking unit and a remaining part of each line sensor is exposed to light;
a scan controller which controls exposure of the exposed part of each line sensor to the light with different exposure times to generate a sensing result for a first exposure time and a sensing result for a second exposure time; and
an output unit which generates an image based on the sensing result for the first exposure time and the sensing result for the second exposure time;
wherein the scan controller generates an internal line trigger signal which controls the exposure of the exposed part of each line sensor to the light based on an external line trigger signal,
wherein the scan controller generates an exposure control signal after a predetermined time elapses whenever the external line trigger signal is input and combines the external line trigger signal and the exposure control signal to generate the internal line trigger signal,
wherein the scan controller generates the exposure control signal at a predetermined specific timing between two external line trigger signals, and
wherein the scan controller includes:
a register which stores a predetermined value and outputs an exposure ratio corresponding to the stored value;
an exposure control signal generator which generates an exposure control signal based on the external line trigger signal and the exposure ratio; and
a signal generator which generates the internal line trigger signal based on the external line trigger signal and the exposure control signal.

2. The TDI image sensor according to claim 1, wherein the exposure control signal generator includes:
a counter control logic which receives the external line trigger signal and the exposure control signal and outputs a counter active signal;
a counter which receives the counter active signal and outputs a count value;
a conversion logic which converts to a number of clock pulses which up-counts the counter based on the exposure ratio stored in the register;
a comparator which outputs, in a comparison result signal, a result of comparing a counter value which is up-counted during a period in which the counter active signal is enabled and a number of clock pulses calculated based on the exposure ratio; and
a pulse generator which receives the comparison result signal of the comparator and outputs the exposure control signal.

3. The TDI image sensor according to claim 1, wherein the scan controller generates the internal line trigger signal whenever the external line trigger signal is input and additionally generates the internal line trigger signal before a next external line trigger signal is generated after the external line trigger signal is input.

4. The TDI image sensor according to claim 3, wherein the scan controller allows a timing of generating the internal line trigger signal which is additionally generated to correspond to a timing set by a user.

5. A TDI image sensor which is capable of adjusting an exposure time, comprising:
a pixel unit which includes a plurality of line sensors in which in a part of each line sensor, incident light is blocked by a light blocking unit and a remaining part of each line sensor is exposed to light;
a scan controller which controls exposure of the exposed part of each line sensor to the light with different exposure times to generate a sensing result for a first exposure time and a sensing result for a second exposure time; and an output unit which generates an image based on the sensing result for the first exposure time and the sensing result for the second exposure time, wherein the scan controller generates an internal line trigger signal which controls the exposure of the exposed part of the line sensor to the light based on an external line trigger signal, wherein the scan controller generates the internal line trigger signal whenever the external line trigger signal is input and additionally generates the internal line trigger signal before a next external line trigger signal is generated after the external line trigger signal is input, wherein the scan controller allows a timing of generating the internal line trigger signal which is additionally generated to correspond to a timing set by a user, and wherein the scan controller includes:

a register which stores a predetermined timing and outputs a delay control signal corresponding to the stored timing;

an exposure control signal generator which generates an exposure control signal based on the external line trigger signal and the delay control signal; and a signal generator which generates the internal line trigger signal based on the external line trigger signal and the exposure control signal.

6. The TDI image sensor according to claim 5, wherein the exposure control signal generator includes:

a latch circuit which enables an oscillator active signal after the external line trigger signal is input and until the exposure control signal is input;

an oscillator which generates an oscillator signal during an enable period of the oscillator active signal;

a counter which increases a counting value of a counter signal whenever the oscillator signal is shifted to a specific level;

a comparison circuit which compares the delay control signal and the counting value of the counting signal to generate a comparison result signal; and a pulse output circuit which generates the exposure control signal based on the comparison result signal.

7. A TDI image sensor which is capable of adjusting an exposure time, comprising:

a pixel unit which includes a plurality of line sensors;

a light blocking unit which blocks light from being incident into some of the plurality of line sensors; and a scan controller which generates an exposure control signal based on an external line trigger signal, generates an internal line trigger signal based on the external line trigger signal and the exposure control signal, and controls a movement of charges of the plurality of line sensors based on the internal line trigger signal;

wherein the scan controller equally divides an interval between a first external line trigger signal and a second external line trigger signal into predetermined sections and generates the exposure control signal based on a predetermined exposure ratio during the divided interval and outputs the generated exposure control signal as the internal line trigger signal.

8. The TDI image sensor according to claim 7, wherein each of the plurality of line sensors includes a part which is blocked by the light blocking unit and an exposed part which is not blocked.

9. The TDI image sensor according to claim 7, wherein the scan controller generates an exposure control signal after a predetermined time elapses whenever the external line trigger signal is input and combines the external line trigger signal and the exposure control signal to output the internal line trigger signal.

10. The TDI image sensor according to claim 7, wherein the scan controller generates the exposure control signal at a predetermined specific timing between two external line trigger signals.

11. The TDI image sensor according to claim 10, wherein the scan controller includes:

a counter control logic which receives the external line trigger signal and the exposure control signal and outputs a counter active signal;

a counter which receives the counter active signal and outputs a count value;

a conversion logic which converts to a number of clock pulses which up-counts the counter based on the exposure ratio stored in the register;

a comparator which outputs a result of comparing a counter value which is up-counted during a period in which the counter active signal is enabled and the number of clock pulses calculated based on the exposure ratio; and a pulse generator which receives a comparison result signal of the comparator and outputs the exposure control signal.

* * * * *